(12) United States Patent
Tsai et al.

(10) Patent No.: US 12,237,949 B2
(45) Date of Patent: Feb. 25, 2025

(54) COMMUNICATION RECEIVER USING MULTI-STAGE CHANNEL EQUALIZATION AND ASSOCIATED METHOD

(71) Applicant: MEDIATEK INC., Hsin-Chu (TW)

(72) Inventors: Chung-Hsien Tsai, Hsinchu (TW);
Che-Yu Chiang, Hsinchu (TW);
Yu-Ting Liu, Hsinchu (TW);
Tsung-Lin Lee, Hsinchu (TW);
Chia-Sheng Peng, Hsinchu (TW);
Ting-Ming Yang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 4 days.

(21) Appl. No.: 18/369,798

(22) Filed: Sep. 18, 2023

(65) Prior Publication Data
US 2024/0129167 A1    Apr. 18, 2024

Related U.S. Application Data

(60) Provisional application No. 63/379,152, filed on Oct. 12, 2022.

(51) Int. Cl.
*H04L 25/03* (2006.01)
*H04L 25/49* (2006.01)

(52) U.S. Cl.
CPC ........ *H04L 25/03057* (2013.01); *H04L 25/49* (2013.01)

(58) Field of Classification Search
CPC ......... H04L 25/03057; H04L 25/03146; H04L 25/061; H04L 25/49; H04L 25/4917
See application file for complete search history.

(56) References Cited

U.S. PATENT DOCUMENTS

| 8,693,532 | B2 * | 4/2014 | Pandey | H04L 25/0305 |
| | | | | 375/232 |
| 8,787,439 | B2 * | 7/2014 | Palusa | H04L 25/03057 |
| | | | | 375/233 |
| 9,077,574 | B1 * | 7/2015 | Healey | H04L 25/03057 |
| 9,654,327 | B2 | 5/2017 | Liao | |
| 9,819,521 | B2 | 11/2017 | Riani | |
| 10,742,453 | B1 | 8/2020 | Wu | |

(Continued)

OTHER PUBLICATIONS

Zheng, "BER optimization through noise-shaping and precoding for 112G SerDes applications", Xilinx DesignCon 2021, Aug. 2021.

*Primary Examiner* — Dac V Ha
(74) *Attorney, Agent, or Firm* — Winston Hsu

(57) ABSTRACT

A communication receiver includes a first signal processing circuit and a second signal processing circuit. The first signal processing circuit includes a first feedforward equalizer and a decision circuit. The first feedforward equalizer processes a received signal to generate a first equalized signal. The decision circuit performs hard decision upon the first equalized signal to generate a first symbol decision signal. The second signal processing circuit includes a second feedforward equalizer, a decision feedforward equalizer, and a first decision feedback equalizer. The second feedforward equalizer processes the first equalized signal to generate a second equalized signal. The decision feedforward equalizer processes the first symbol decision signal to generate a third equalized signal. The first decision feedback equalizer generates a second symbol decision signal according to the second equalized signal and the third equalized signal.

16 Claims, 2 Drawing Sheets

(56) References Cited

U.S. PATENT DOCUMENTS

| | | |
|---|---|---|
| 11,240,075 B2 | 2/2022 | Palusa |
| 11,770,276 B1 * | 9/2023 | Medra ............... H04L 25/03057 375/233 |
| 2022/0158878 A1 | 5/2022 | Palusa |

* cited by examiner

COMMUNICATION RECEIVER USING MULTI-STAGE CHANNEL EQUALIZATION AND ASSOCIATED METHOD

CROSS REFERENCE TO RELATED APPLICATIONS

This application claims the benefit of U.S. Provisional Application No. 63/379,152, filed on Oct. 12, 2022. The content of the application is incorporated herein by reference.

BACKGROUND

The present invention relates to data communications, and more particularly, to a communication receiver using multi-stage channel equalization and an associated method.

In modern life, bandwidth-hungry applications grow rapidly. More and more demands of high-throughput data centers emerge such that the Ethernet standard evolves to meet the demands. To achieve higher bandwidth, a higher baud rate (which results in a shorter data interval) and/or a higher-order modulation scheme (which requires a higher signal-to-noise (SNR) requirement) may be adopted. Mueller-Muller (MM) baud-rate timing tracking (TK) is widely used in a high-speed receiver. To perform a robust MM-TR, qualified hard decision and low latency are two key factors with a trade-off relation. When the transmission rate is increased for achieving higher bandwidth, a compromise between latency and symbol decision becomes a significant task for the receiver designer. When the transmission bandwidth is increased for achieving higher bandwidth, channel insertion loss from cable materials, connectors, and the printed circuit board becomes severe. The equalizer generally requires more power to equalize the channel loss. Since power consumption is always the smaller the better in every communication systems, designing a low-power equalizer to compensate for a wide range of inter-symbol interference (ISI) is a challenging task for the receiver designer. Thus, there is a need for an innovative receiver design which is capable of handling these challenges well to satisfy the system performance target.

SUMMARY

One of the objectives of the claimed invention is to provide a communication receiver using multi-stage channel equalization and an associated method. For example, the proposed communication receiver using multi-stage channel equalization can achieve jointly-optimized timing tracking and equalization.

According to a first aspect of the present invention, an exemplary communication receiver is disclosed. The exemplary communication receiver includes a first signal processing circuit and a second signal processing circuit. The first signal processing circuit includes a first feedforward equalizer and a decision circuit. The first feedforward equalizer is configured to process a received signal to generate a first equalized signal. The decision circuit is configured to perform hard decision upon the first equalized signal to generate a first symbol decision signal. The second signal processing circuit includes a second feedforward equalizer, a decision feedforward equalizer, and a first decision feedback equalizer. The second feedforward equalizer is configured to process the first equalized signal to generate a second equalized signal. The decision feedforward equalizer is configured to process the first symbol decision signal to generate a third equalized signal. The first decision feedback equalizer is configured to generate a second symbol decision signal according to the second equalized signal and the third equalized signal.

According to a second aspect of the present invention, an exemplary symbol decision method is disclosed. The exemplary symbol decision method includes: performing a first signal processing operation and a second signal processing operation. The first signal processing operation includes: performing first feedforward equalization upon a received signal to generate a first equalized signal; and performing hard decision upon the first equalized signal to generate a first symbol decision signal. The second signal processing operation includes: performing second feedforward equalization upon the first equalized signal to generate a second equalized signal; performing decision feedforward equalization upon the first symbol decision signal to generate a third equalized signal; and performing first decision feedback equalization to generate a second symbol decision signal according to the second equalized signal and the third equalized signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
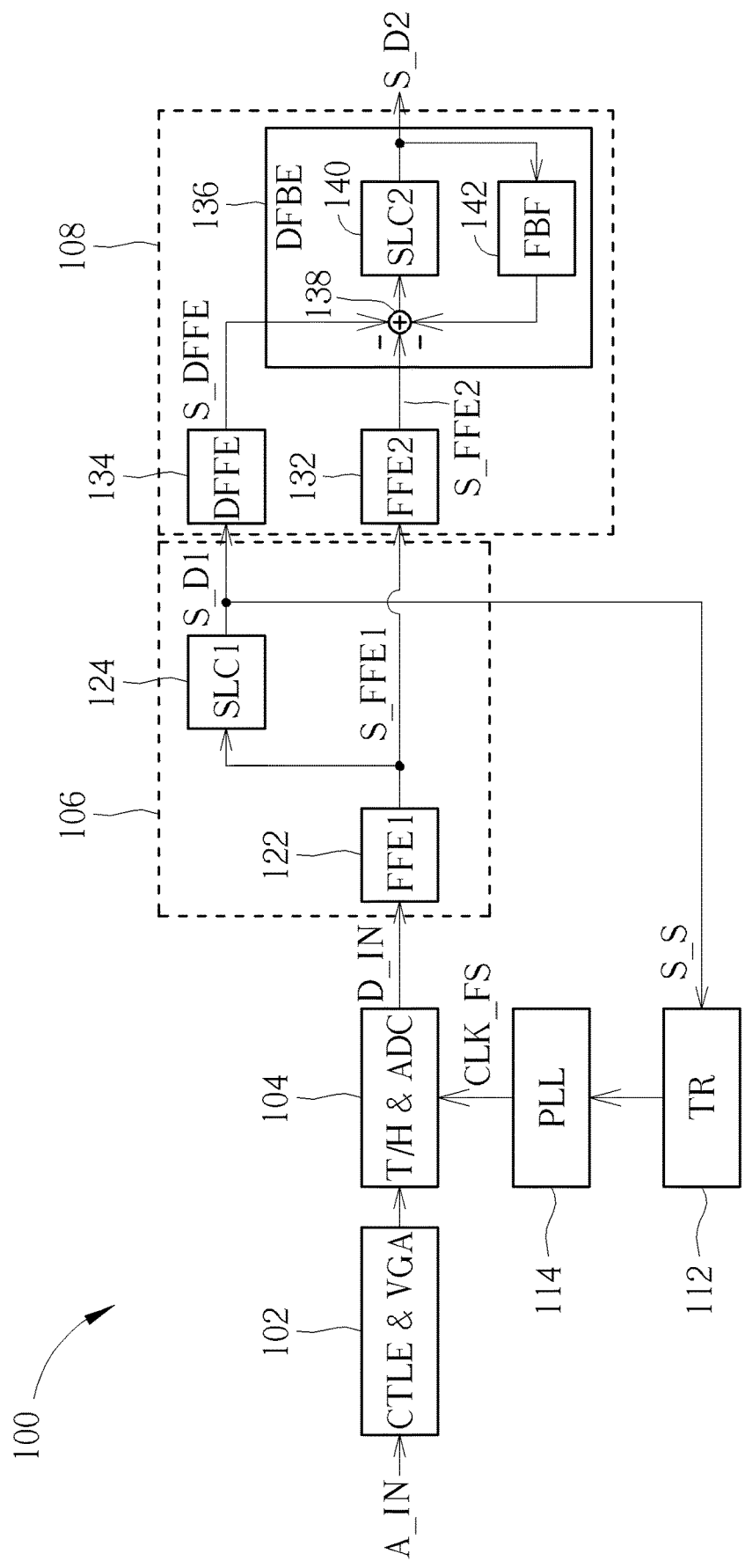
FIG. 1 is a diagram illustrating a communication receiver according to an embodiment of the present invention.

FIG. 1 is a diagram illustrating a communication receiver according to an embodiment of the present invention. The communication receiver 100 may be a part of a data communication system. For example, the communication receiver 100 may be a serializer/deserializer (SerDes) receiver. In this embodiment, the communication receiver 100 employs a multi-stage channel equalization scheme to achieve optimized equalization and/or optimized timing tracking. As shown in FIG. 1, the communication receiver 100 includes a continuous-time linear equalizer and variable gain amplifier block (labeled by CTLE & VGA) 102, a track-and-hold and analog-to-digital converter block (labeled by T/H & ADC) 104, a plurality of signal processing circuits 106, 108 a timing tracking circuit (labeled by TR) 112, and a phase-locked loop (PLL) 114. The communication receiver 100 is configured to process a received waveform A_IN (which is an analog signal) to generate a decision symbol signal S_D2. For example, the received waveform A_IN is a pulse-amplitude modulation (PAM) signal that is generated and transmitted from a communication transmitter of the data communication system to the communication receiver 100 of the data communication system via a channel. Taking 4-level PAM signaling for example, there are four symbols {−3, −1, +1, +3}, and each symbol corresponds to a pair of two bits. For example, four bit choices 00, 01, 11, and 10 may be associated with amplitudes of −3, −1, +1, and +3, respectively.

The received waveform A_IN is converted into a received signal D_IN (which is a digital signal) by the track-and-hold and analog-to-digital converter block 104 after undergoing certain analog signal processing at the continuous-time linear equalizer and variable gain amplifier block 102, where the track-and-hold and analog-to-digital converter block 104 operates according to a sampling clock CLK_FS generated from the PLL 114.

The signal processing circuit 106 includes a feedforward equalizer (labeled by FFE1) 122 and a decision circuit (labeled by SLC1) 124. Any suitable feedforward equalizer structure may be employed by the feedforward equalizer 122. That is, the present invention has no limitations on the circuit design of the feedforward equalizer 122. The feedforward equalizer 122 is configured to process the received signal D_IN (which is an ADC output with a sampling rate defined by the sampling clock CLK_FS) to generate an equalized signal S_FFE1. The decision circuit 124 is configured to perform hard decision upon the equalized signal S_FFE1 to generate a symbol decision signal S_D1. For example, the decision circuit 124 may be a slicer. In a case where the received signal D_IN is derived from 4-level PAM signaling, the equalized signal S_FFE1 carries soft data, and the symbol decision signal S_D1 carries hard data (i.e., symbols each being decided by the slicer to be one of four symbols {−3, −1, +1, +3}).

The signal processing circuit 106 is followed by the signal processing circuit 108. Hence, the symbol decision signal S_D1 output from the signal processing circuit 106 may be regarded as a tentative symbol decision result to be further processed by the following signal processing circuit 108, and the equalized signal S_FFE1 output from the signal processing circuit 106 may be regarded as a tentative channel equalization result to be further processed by the following signal processing circuit 108. As shown in FIG. 1, the signal processing circuit 108 includes a feedforward equalizer (labeled by FFE2) 132, a decision feedforward equalizer (labeled by DFFE) 134, and a decision feedback equalizer (labeled by DFBE) 136. Any suitable feedforward equalizer structure may be employed by the feedforward equalizer 132. That is, the present invention has no limitations on the circuit design of the feedforward equalizer 132. The feedforward equalizer 132 is configured to process the equalized signal S_FFE1 to generate an equalized signal S_FFE2. In this embodiment, the decision feedforward equalizer 134 may be implemented using a direct-sum decision feedforward equalizer. The decision feedforward equalizer 134 is configured to process the symbol decision signal S_D1 (which is a tentative symbol decision result) to generate an equalized signal S_DFFE. The decision feedback equalizer 136 is configured to generate the symbol decision signal S_D2 (which is a final symbol decision result) according to the equalized signals S_DFFE and S_FFE2. Any suitable decision feedback equalizer structure may be employed by the decision feedback equalizer 136.

For example, the decision feedback equalizer 136 may include a combining circuit 138, a decision circuit (labeled by SLC2) 140, and a feedback filter (labeled by FBF) 142. As a person skilled in the art can readily understand details of the decision feedback equalizer 136 shown in FIG. 1, further description is omitted here for brevity.

Compared to the former feedforward equalizer 122 included in the signal processing circuit 106, the later feedforward equalizer 132 included in the signal processing circuit 108 is less power-hungry. For example, the feedforward equalizer 122 is responsible for dealing with the most (e.g., 80% or more) of the feedforward equalization task, and the feedforward equalizer 122 is responsible for dealing with the remaining (e.g., 20% or less) of the feedforward equalization task. With the latter feedforward equalizer 132 intentionally placed at the feedforward equalization path, the feedforward equalization procedure is divided into two stages, thereby allowing the decision circuit 124 to generate a tentative symbol decision result according to a tentative channel equalization result generated from the former feedforward equalizer 122. In this embodiment, the tentative symbol decision result can be used to enhance the channel equalization performance. Specifically, the decision feedforward equalizer 134 refers to the tentative symbol decision result for generating a re-constructed ISI signal as an additional input of the decision feedback equalizer 136 for facilitating the symbol decision task at the decision feedback equalizer 136. In this way, the channel equalization performance can be improved by the re-constructed ISI signal derived from the tentative symbol decision result.

Furthermore, due to the fact that the feedforward equalization procedure is divided into two stages by the latter feedforward equalizer 132, the decision circuit 124 is allowed to output its tentative symbol decision result to facilitate other functionality (e.g., timing tracking). In this embodiment, the timing tracking circuit 112 is configured to control timing of the sampling clock CLK_FS according to an input signal S_S derived from the signal processing circuit 106. For example, the timing tracking circuit 112 may employ a clock and data recovery (CDR) technique to control timing of the sampling clock CLK_FS. In one exemplary design, the input signal S_S used by the timing tracking circuit 112 may be the symbol decision signal S_D1.

Since the timing tracking circuit 112 uses the tentative channel equalization result rather than the final channel equalization result, low-latency timing tracking can be achieved by the communication receiver 100. Furthermore, since the feedforward equalizer 122 is used by the channel equalization and is re-used by the timing tracking, no dedicated feedforward equalizer is needed to provide the input signal S_S used by the timing tracking circuit 112. In this way, the power consumption of the communication receiver 100 can be greatly reduced due to hardware sharing.

Regarding the signal processing circuit 106, the decision circuit 124 can output its tentative symbol decision result to facilitate other functionality (e.g., timing tracking). In the embodiment shown in FIG. 1, the input signal S_S of the timing tracking circuit 112 is set by the symbol decision signal S_D1. However, this is for illustrative purposes only, and is not meant to be a limitation of the present invention. In practice, any communication receiver using the proposed multi-stage channel equalization scheme to achieve improved channel equalization performance falls within the scope of the present invention.

Figure 2:
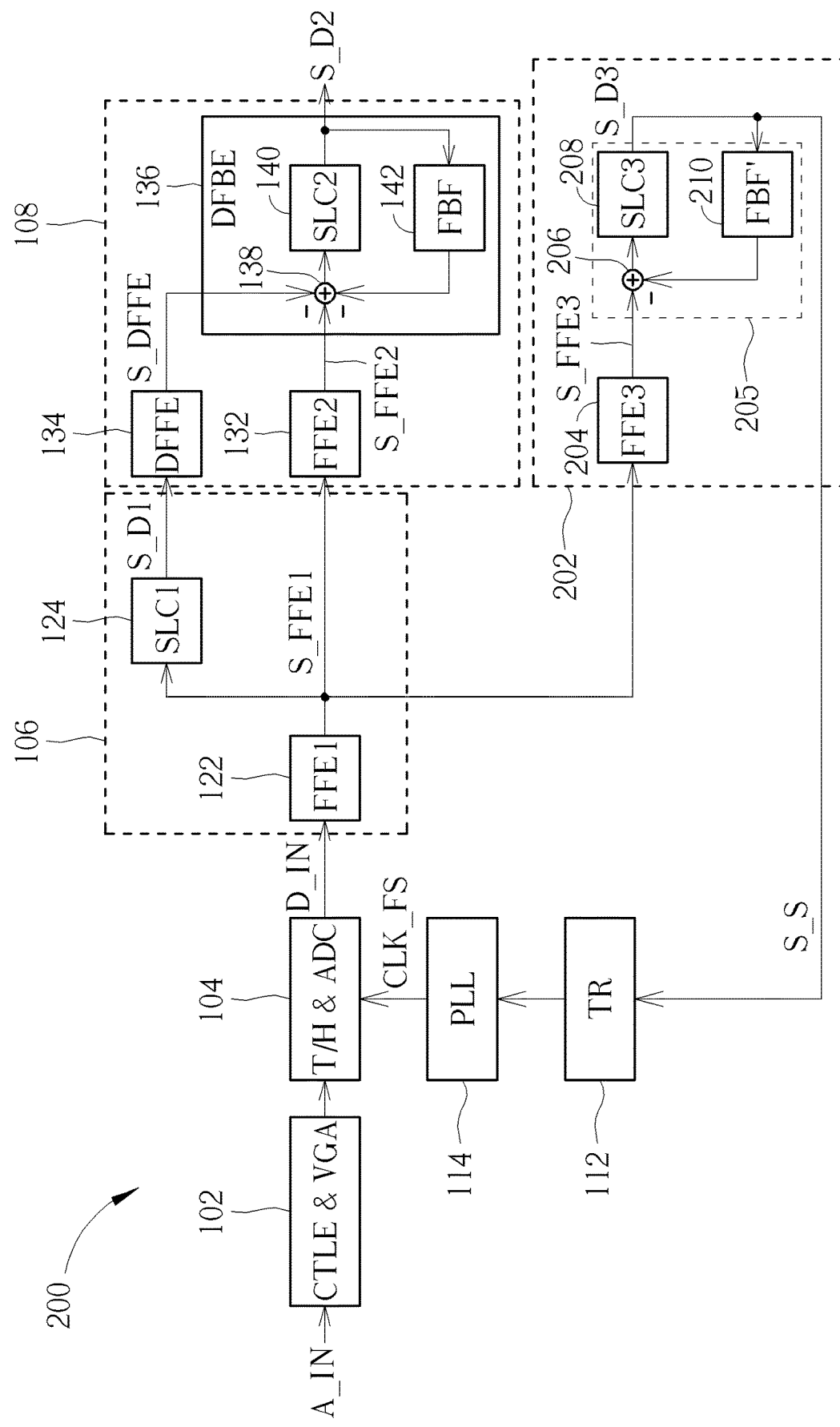
FIG. 2 is a diagram illustrating another communication receiver according to an embodiment of the present invention.

FIG. 2 is a diagram illustrating another communication receiver according to an embodiment of the present invention. The communication receiver 200 may be a part of a data communication system. For example, the communication receiver 200 may be a SerDes receiver. The difference between the communication receivers 100 and 200 is that the communication receiver 200 further includes a signal processing circuit 202. In this embodiment, the signal processing circuit 202 includes a feedforward equalizer (labeled by FFE3) 204 and a decision feedback equalizer 205. Any suitable feedforward equalizer structure may be employed by the feedforward equalizer 204, and any suitable decision feedback equalizer structure may be employed by the decision feedback equalizer 205. For example, the decision feedback equalizer 205 may include a combining circuit 206, a decision circuit (labeled by SLC3) 208, and a feedback filter (labeled by FBF') 210. The feedforward equalizer 204 is configured to process the equalized signal S_FFE1 to generate an equalized signal S_FFE3. The decision feedback equalizer 205 is configured to generate a symbol decision signal S_D3 according to the equalized signal S_FFE3. In this embodiment, the symbol decision signal S_D3 may be used as the input signal S_S of the timing tracking circuit 112.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication receiver comprising:
   a first signal processing circuit, comprising:
   a first feedforward equalizer, configured to process a received signal to generate a first equalized signal; and
   a decision circuit, configured to perform hard decision upon the first equalized signal to generate a first symbol decision signal; and
   a second signal processing circuit, comprising:
   a second feedforward equalizer, configured to process the first equalized signal to generate a second equalized signal;
   a decision feedforward equalizer, configured to process the first symbol decision signal to generate a third equalized signal; and
   a first decision feedback equalizer, configured to generate a second symbol decision signal according to the second equalized signal and the third equalized signal.

2. The communication receiver of claim 1, wherein the decision feedforward equalizer is a direct-sum decision feedforward equalizer.

3. The communication receiver of claim 1, wherein the received signal is a digital signal derived from a pulse-amplitude modulation (PAM) signal.

4. The communication receiver of claim 1, wherein the communication receiver is a serializer/deserializer (SerDes) receiver.

5. The communication receiver of claim 1, further comprising:
   an analog-to-digital converter, configured to convert an analog input into the received signal according to a sampling clock; and
   a timing tracking circuit, configured to control timing of the sampling clock according to an input signal derived from the first signal processing circuit.

6. The communication receiver of claim 5, wherein the input signal is the first symbol decision signal.

7. The communication receiver of claim 1, further comprising:
   a third signal processing circuit, comprising:
   a third feedforward equalizer, configured to process the first equalized signal to generate a third equalized signal; and
   a second decision feedback equalizer, configured to generate a third symbol decision signal according to the third equalized signal;
   an analog-to-digital converter, configured to convert an analog input into the received signal according to a sampling clock; and
   a timing tracking circuit, configured to control timing of the sampling clock according to an input signal derived from the third signal processing circuit.

8. The communication receiver of claim 7, wherein the input signal is the third symbol decision signal.

9. A symbol decision method comprising:
   performing a first signal processing operation, comprising:
   performing first feedforward equalization upon a received signal to generate a first equalized signal; and
   performing hard decision upon the first equalized signal to generate a first symbol decision signal; and
   performing a second signal processing operation, comprising:
   performing second feedforward equalization upon the first equalized signal to generate a second equalized signal;
   performing decision feedforward equalization upon the first symbol decision signal to generate a third equalized signal; and
   performing first decision feedback equalization to generate a second symbol decision signal according to the second equalized signal and the third equalized signal.

10. The symbol decision method of claim 9, wherein the decision feedforward equalization is direct-sum decision feedforward equalization.

11. The symbol decision method of claim 9, wherein the received signal is a digital signal derived from a pulse-amplitude modulation (PAM) signal.

12. The symbol decision method of claim 9, wherein the symbol decision method is employed by a serializer/deserializer (SerDes) receiver.

13. The symbol decision method of claim 9, further comprising:
   performing analog-to-digital conversion upon an analog input according to a sampling clock, to generate the received signal; and
   performing timing tracking to control timing of the sampling clock according to an input signal derived from the first signal processing operation.

14. The symbol decision method of claim 13, wherein the input signal is the first symbol decision signal.

15. The symbol decision method of claim 9, further comprising:
   performing a third signal processing operation, comprising:
   performing third feedforward equalization upon the first equalized signal to generate a third equalized signal; and
   performing second decision feedback equalization to generate a third symbol decision signal according to the third equalized signal;

performing analog-to-digital conversion upon an analog input according to a sampling clock, to generate the received signal; and performing timing tracking to control timing of the sampling clock according to an input signal derived from the third signal processing operation.

16. The symbol decision method of claim 15, wherein the input signal is the third symbol decision signal.

* * * * *